US012689188B2

(12) United States Patent
Anekal Venkataramanappa et al.

(10) Patent No.: US 12,689,188 B2
(45) Date of Patent: Jul. 21, 2026

(54) EXPANDABLE POWER DISTRIBUTION UNIT FOR UNINTERRUPTIBLE POWER SUPPLY

(71) Applicant: SCHNEIDER ELECTRIC IT CORPORATION, Foxboro, MA (US)

(72) Inventors: Dileep Anekal Venkataramanappa, Bangalore (IN); Santhosh Kumar Vijayan, Bangalore (IN); Aravindhan Rajendhiran, Bangalore (IN)

(73) Assignee: SCHNEIDER ELECTRIC IP CORPORATION, Foxboro, MA (US)

( * ) Notice: Subject to any disclaimer, the term of this patent is extended or adjusted under 35 U.S.C. 154(b) by 230 days.

(21) Appl. No.: 18/528,891

(22) Filed: Dec. 5, 2023

(65) Prior Publication Data

US 2024/0222943 A1    Jul. 4, 2024

(30) Foreign Application Priority Data

Dec. 29, 2022    (IN) .............................. 202211076708

(51) Int. Cl.
*H02B 1/36*        (2006.01)
*H02B 1/48*        (2006.01)
(52) U.S. Cl.
CPC ................. *H02B 1/36* (2013.01); *H02B 1/48* (2013.01)
(58) Field of Classification Search
None
See application file for complete search history.

(56) References Cited

U.S. PATENT DOCUMENTS

| | | | | |
|---|---|---|---|---|
| 8,072,736 B2 * | 12/2011 | Roosdorp | ........... | B60R 16/0238 |
| | | | | 361/647 |
| 8,212,427 B2 * | 7/2012 | Spitaels | ............... | H01R 25/142 |
| | | | | 307/147 |
| 9,287,688 B2 | 3/2016 | Ewing et al. | | |
| 9,484,692 B2 | 11/2016 | Irons | | |
| 10,317,972 B2 * | 6/2019 | Jen | ................... | H02J 13/00016 |
| 10,455,722 B1 * | 10/2019 | Wildstone | ............ | H05K 7/1492 |
| 2005/0170678 A1 | 8/2005 | Donahue, IV | | |
| 2007/0159775 A1 * | 7/2007 | Ewing | .................... | H02B 1/306 |
| | | | | 361/642 |
| 2011/0244715 A1 * | 10/2011 | Aldag | .................. | H01R 25/142 |
| | | | | 439/488 |
| 2017/0111451 A1 * | 4/2017 | Thul | .................... | H05K 7/1492 |

OTHER PUBLICATIONS

Extended European Search Report from corresponding European Application No. 23218335.0 dated Jun. 6, 2024.

* cited by examiner

*Primary Examiner* — Courtney L Smith
(74) *Attorney, Agent, or Firm* — Kinney & Lange, P.A.

(57)        ABSTRACT
A power system includes an enclosure and a sliding power distribution unit (PDU) configured to be at least partially within the enclosure in a closed position and to at least partially extend beyond the enclosure in an open position. The sliding PDU includes a plurality of outlets. The sliding PDU is configured to present a desired number of outlets of the plurality of outlets. The enclosure includes a locking screw to secure the sliding PDU in place in the open position. The enclosure further includes a stopper flange to limit movement of the sliding PDU to the open position. The sliding PDU may include a holding knob to secure and move the sliding PDU.

21 Claims, 7 Drawing Sheets

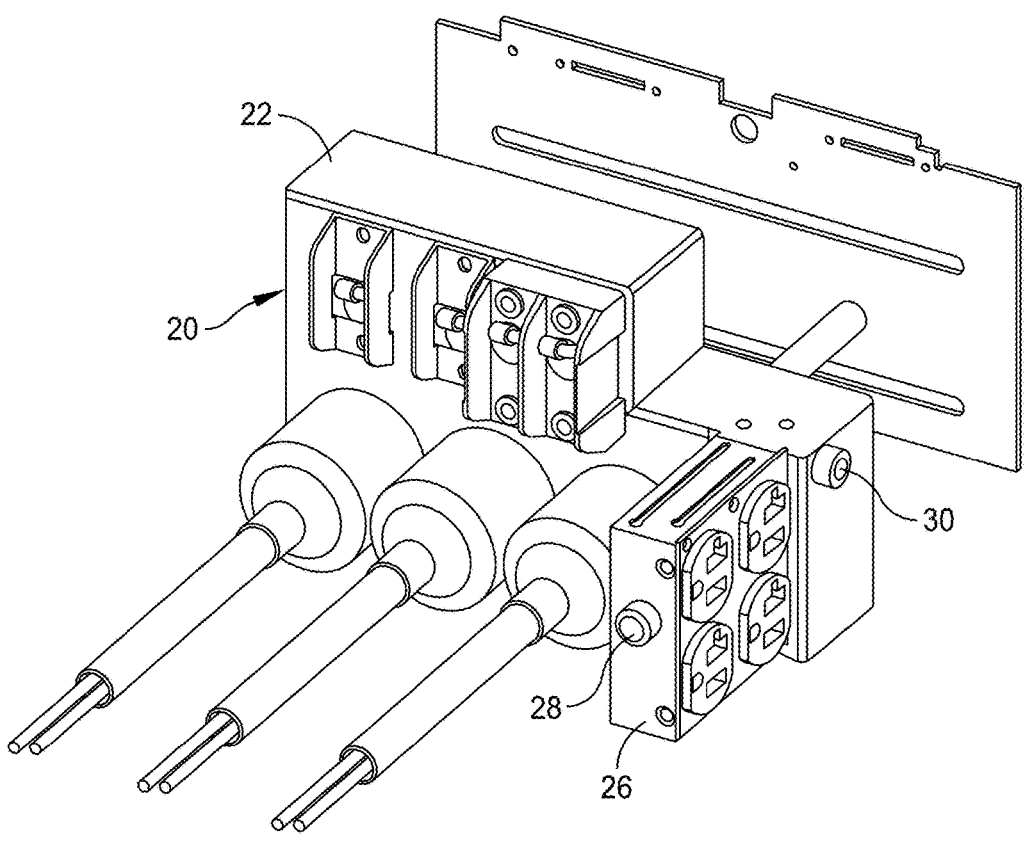
FIG. 8
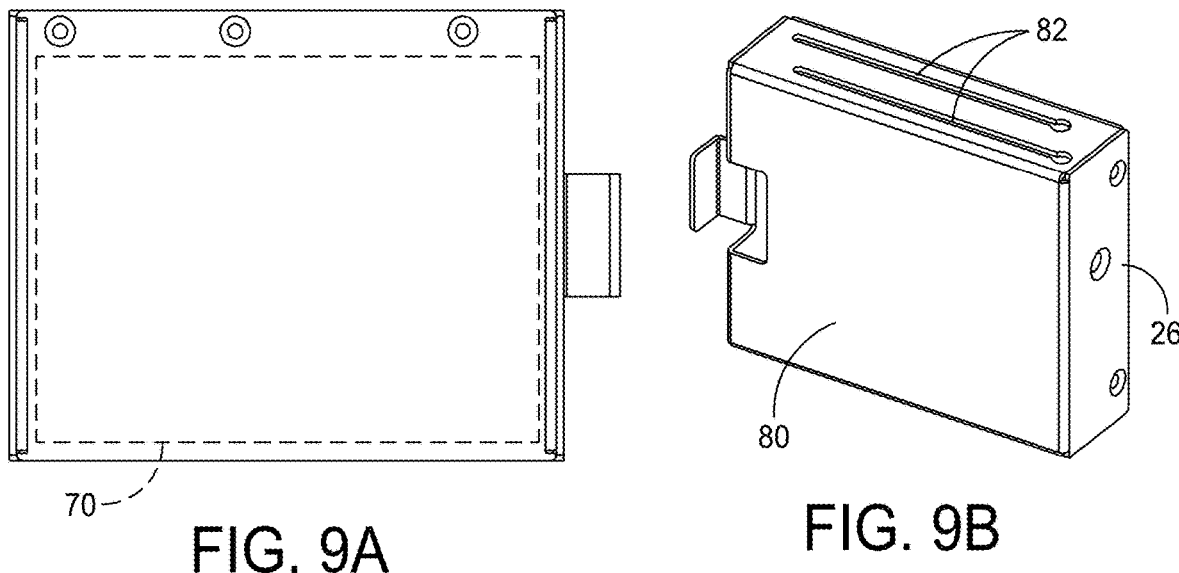
FIG. 9A              FIG. 9B

1

EXPANDABLE POWER DISTRIBUTION UNIT FOR UNINTERRUPTIBLE POWER SUPPLY

CROSS-REFERENCE TO RELATED APPLICATION

This application claims the benefit under 35 U.S.C. § 119(e) of Indian Application No. 202211076708 titled EXPANDABLE POWER DISTRIBUTION UNIT FOR UNINTERRUPTIBLE POWER SUPPLY, filed on Dec. 29, 2022, which is incorporated herein by reference in its entirety for all purposes.

BACKGROUND OF DISCLOSURE

1. Field of Disclosure

Aspects of the present disclosure relate generally to uninterruptible power supplies (UPSs), and more particularly to an expandable power distribution unit (PDU) for a UPS for a given form factor of the UPS.

2. Discussion of Related Art

Power distribution units or PDUs are an integral part of an uninterruptible power supply (UPS), which distributes the power to appliances, such as servers, computers, products, network devices, etc. A typical PDU consists of outlet connectors and circuit breakers. The types of outlets can vary depending on the region, such as NEMA and IEC connectors.

Multiple outlet groups are utilized by appliances at the same time. Circuit breakers are used to prevent the electrical and electronic parts beyond preset voltage limits. Reference can be made to FIGS. 1A-1C in which FIG. 1A shows NEMA connectors 1, 2, FIG. 1B shows circuit breakers 3, 4, and FIG. 1C shows IEC connectors 5, 6.

Referring to FIG. 2, a chassis rack unit (RU) is indicated at 7. As shown, the chassis rack unit 7 includes a PDU section 8 including several output connectors, each indicated at 10, and two circuit breakers, each indicated at 11. The chassis rack unit 7 further includes an input cable 9, an XBP connector 12, communication connectors, together indicated at 13, a ventilation area 14, and an NMC area 15. For a given chassis rack unit, such as chassis rack unit 7, a space of the PDU 8 is often compromised due to other requirements, such as the ventilation area 14, the inputs (input cable 9), the communication network ports 13, smart slots, XBP connections 12, etc. Also, closely spaced connectors cause plug-in issues and customer dissatisfaction. In addition, PDU offerings may be required to provide appropriate connectors for a specific region. This requires the customer to purchase several PDU configurations to use different connectors.

In some embodiments, in order to counter these issues, the chassis rack unit is increased, e.g., 2U to 3U, which increases cost and weight. To accommodate the limited space, a "pig-tail" connector may be employed, which is an expensive solution. Another approach, provided there is available space, is to reduce a number of output sockets, which may not be desirable.

The limited space on the rear panel of the UPS limits the number of outlets of the PDU. Additionally, once outlets are fixed into the chassis, it is difficult to change the type of outlets (e.g., change from NEMA to IEC).

SUMMARY OF DISCLOSURE

In one embodiment, a power system comprises an enclosure and a sliding power distribution unit (PDU) configured to be at least partially within the enclosure in a closed position and to at least partially extend beyond the enclosure in an open position. The sliding PDU may include a plurality of outlets.

Embodiments of the power system further may include configuring the sliding PDU to present a desired number of outlets of the plurality of outlets. The sliding PDU may include a locking screw to secure the sliding PDU in place in the open position. The sliding mechanism may include at least one recess configured to receive the locking screw when securing the sliding mechanism in the open position. The sliding PDU may include a stopper flange to limit movement of the sliding PDU to the open position. The sliding PDU may include a holding knob to secure and move the sliding mechanism. The enclosure may include a plurality of additional connectors. The enclosure may include a plurality of circuit breakers.

One aspect of the present disclosure is directed to a power system comprising an enclosure and a sliding power distribution unit (PDU) configured to be at least partially within the enclosure in a closed position and to at least partially extend beyond the enclosure in an open position. The sliding PDU comprises a plurality of outlets.

Embodiments of the power system further may include configuring the sliding PDU to present a desired number of outlets of the plurality of outlets. The enclosure may include a locking screw to secure the sliding PDU in place in the open position. The enclosure may include at least one opening configured to receive the locking screw when securing the sliding PDU in the open position. The sliding PDU may include a stopper flange to limit movement of the sliding PDU to the open position. The sliding PDU may include a holding knob to secure and move the sliding PDU. The enclosure may include a plurality of additional connectors. The enclosure may include a plurality of circuit breakers. The sliding PDU may include a cartridge slidably coupled to the enclosure within an opening formed in the enclosure. The cartridge may include the plurality of outlets. The enclosure may include a locking screw to secure the cartridge in place in the open position. The enclosure further may include at least one opening configured to receive the locking screw when securing the cartridge in the open position. The cartridge further may include a stopper flange to limit movement of the cartridge to the open position. The cartridge further may include a holding knob to secure and move the cartridge. The power system may include an uninterruptible power supply.

Another aspect of the present disclosure is directed to a method of selectively extending power outlets within a power system. In one embodiment, the method comprises: extending a sliding power distribution unit (PDU) configured to be at least partially within the enclosure in a closed position to at least partially extend beyond the enclosure in an open position. The sliding PDU comprises a plurality of outlets.

Embodiments of the method further may include configuring the sliding PDU to present a desired number of outlets of the plurality of outlets. The method further may include securing the sliding PDU in place in the open position with a locking screw. The sliding PDU may include at least one opening configured to receive the locking screw when securing the sliding PDU in the open position. The method further may include limiting movement of the sliding PDU to an open position with a stopper flange. The method further may include securing and moving the sliding PDU with a holding knob. The enclosure may include a plurality of additional connectors. The enclosure may include a plurality of circuit breakers.

BRIEF DESCRIPTION OF DRAWINGS

The accompanying drawings are not intended to be drawn to scale. In the drawings, each identical or nearly identical component that is illustrated with various figures, are represented by a line numeral. For purposes of clarity, not every component may be labeled in every drawing. In the drawings:

FIG. 8 is a perspective view of the expandable PDU showing space for ventilation;

FIGS. 9A and 9B are views showing available footprint area for outlets on the sliding mechanism;

DETAILED DESCRIPTION

Figures 1A, 1B, 1C:
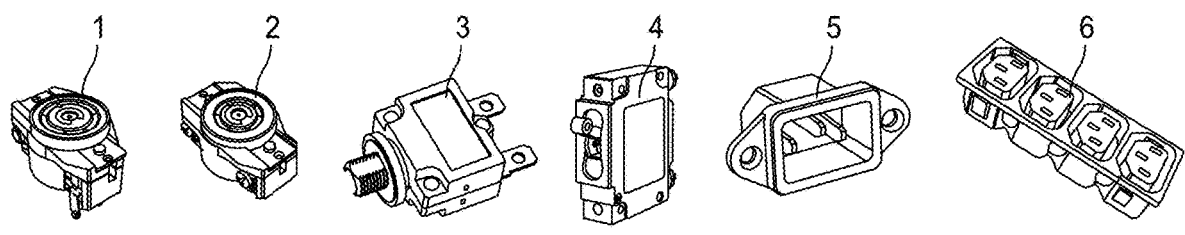
FIG. 1A is a perspective view showing NEMA connectors.
FIG. 1B is a perspective view showing circuit breakers.
FIG. 1C is a perspective view showing IEC connectors.
Figure 2:
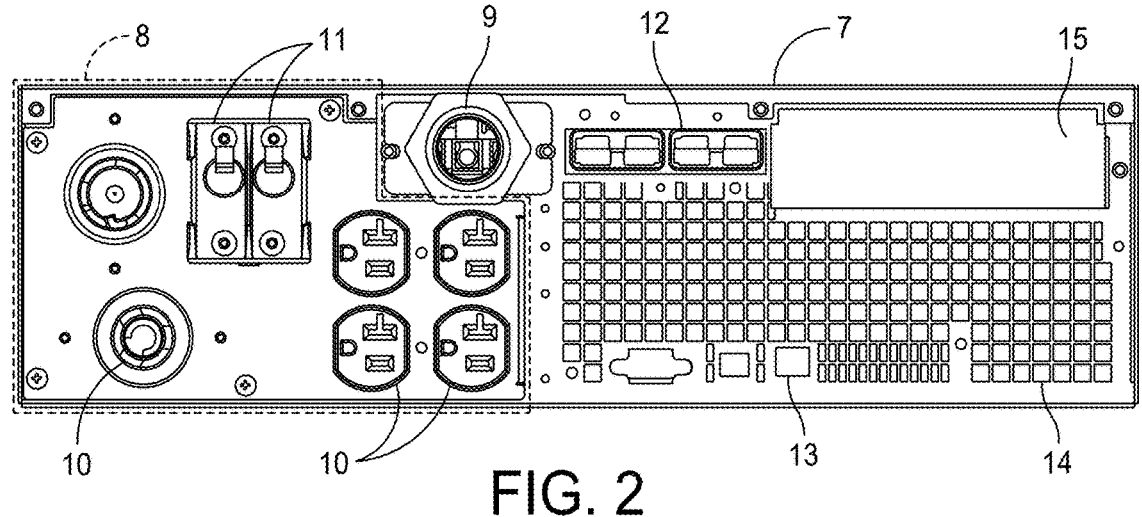
FIG. 2 is a back view of a presently available UPS.

Embodiments of the present disclosure are directed to an expandable PDU that allows for more outlets. The expandable PDU has a modular design to allow changing outlet types after deployment. In certain configurations, the design of UPS can remain the same regardless of the number and types of outlets are chosen for the expandable PDU.

In one embodiment, a power system includes a PDU enclosure and sliding PDU with multiple outlets. The PDU is partially within the PDU enclosure in a closed position and partially extends beyond the PDU enclosure in an open position.

In some embodiments, the PDU has a sliding portion that slides in and out of UPS chassis, the outlets in the sliding portion may be replaced for other types after deployment, and the sliding portion may be locked into position with captive screw.

In some embodiments, an expandable PDU provides the following advantages over existing PDUs. For example, the expandable PDU utilizes a vacant internal chassis space/depth to create more outlets. The expandable PDU includes a relatively small footprint configured to provide more outlets in the same form factor. The expandable PDU includes NEMA and IEC outlets, or any other type of outlet, in same PDU. The expandable PDU is configured to provide sufficient space for ventilation, network outlets, even though the expandable PDU provides more outlets. The expandable PDU provides a common solution for different region outlet requirements. The expandable PDU is configured to reduce process time, with several variants of PDUs provided in one offering. The expandable PDU is configured to address a rack depth issue with the connector cables due to the lateral cabling connections.

In one embodiment, an expandable PDU includes a sliding mechanism, which increases the number of outlets offered by the PDU. The sliding mechanism provides an interface between a PCB outlet to a rear panel which creates multiple power connections.

In some embodiments, the expandable PDU offers enhanced configurability in that the sliding mechanism offers four (4) to six (6) outlets, which can be configured to meet a desired need. The expandable PDU provides a robust sliding mechanism, with the sliding mechanism being configured to provide interruption-free outputs by exposing either two (2), four (4) or six (6) outlets as needed. The expandable PDU is modular in design in that customized PDUs can offer regional outlets, thereby providing modularity to different regional outlets in single PDU. For example, the expandable PDU can be configured to have NEMA and IEC/IEC and 5-20 outlets in a single PDU. The expandable PDU is configured to reduce material labor and overhead (MLO) and process time for different PDU SKU design, implementation and developments. The expandable PDU is configured to require no additional rack size, providing additional outlets without increasing the rack unit. The expandable PDU offers a low-cost solution that is 2.5 times less costly than present designs. The expandable PDU offers improved ventilation due to the area of vacant space inside the unit during the outlet utilization.

In some embodiments, the sliding mechanism of the expandable PDU offers an improved approach to eradicate the need of excess space for additional outlets. Unused lateral space on the PDU is available to use for additional connector placement, in turn increasing the number of outlets. This can be done by using increased PDU in outlet connection zone. The expandable PDU allows for multiple outlet groups in which different outlet connectors in different combinations can be achieved at an available footprint. The expandable PDU offers a versatile design, and by knowing the footprint, the PDU can be designed in the required manner, e.g., a customized PDU. This reduces process time by making the assembly in the same PDU for XLT and XLI, thereby reducing the process time to change the PDU for different regionals. The versatile design also reduces inventory while achieving selective outlet connections. The expandable PDU can set for required outlets starting from two to six outlets by using the lock provided as explained below.

In some embodiments, the sliding mechanism of the expandable PDU can be positioned in locations in which space is available.

In some embodiments, the expandable PDU provides a modular solution and is configurable to satisfy a particular market.

In some embodiments, the expandable PDU can be modified to accommodate shorter depth units.

In some embodiments, the expandable PDU can be used at any portion of a UPS where space is available.

In some embodiments, the sliding PDU provides an interface between the PCB outlet to the rear panel, which creates multiple power connections.

Figure 3A:
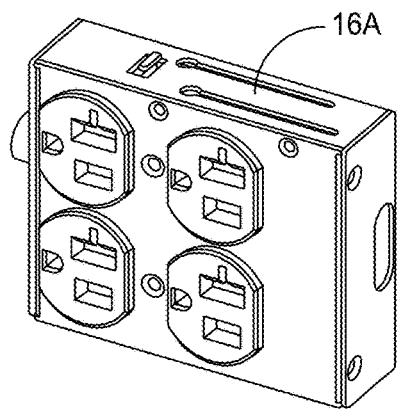
FIG. 3A is a perspective view of a sliding mechanism having four outlets.
Figure 3B:
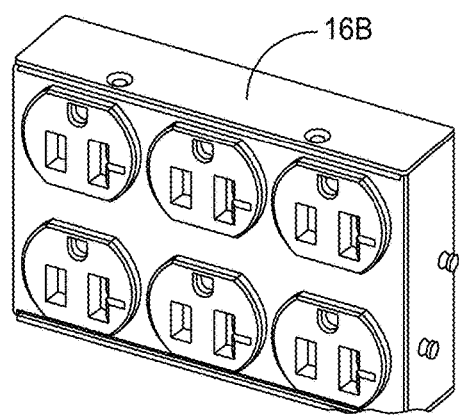
FIG. 3B is a perspective view of a sliding mechanism having six outlets.

Referring to FIGS. 3A and 3B, a sliding mechanism of the PDU is configurable, offering a sliding mechanism 16A having four (4) outlets (FIG. 3A) and a sliding mechanism 16B having six (6) outlets (FIG. 4B), as desired.

Figures 4A, 4B:
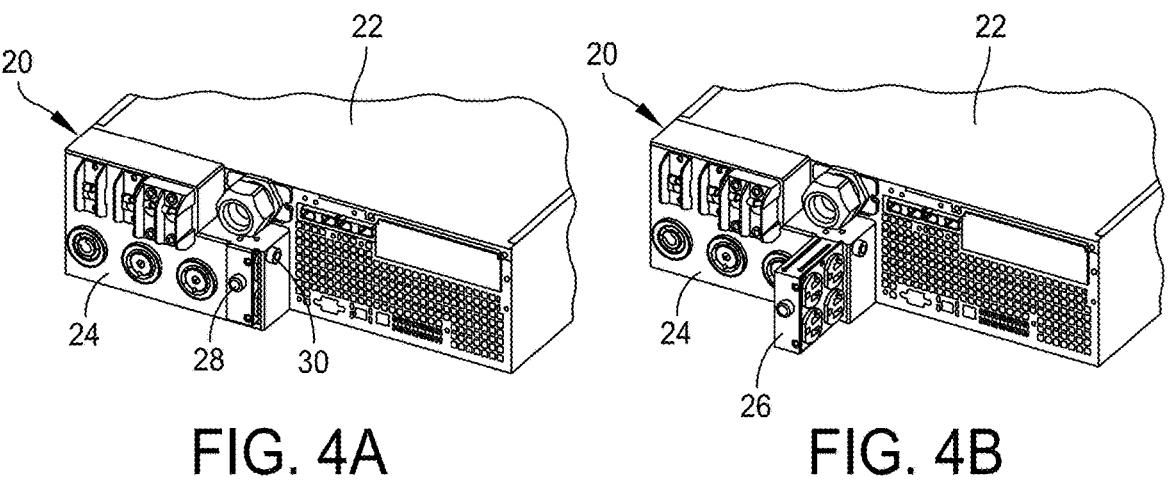
FIGS. 4A-4D are perspective views showing a sequence of assembly of an expandable PDU of an embodiment of the present disclosure.

Referring to FIGS. 4A-4B, an expandable PDU of an embodiment of the present disclosure is generally indicated at 20. The expandable PDU 20 is configured to be mounted on a UPS 22. The PDU is a device including multiple outlets to distribute electric power, especially to electronic equipment. As will be shown in greater detail below, the PDU may be configured in any desired configuration. A basic PDU may be configured to provide power from an input to several outlets. An intelligent PDU may be configured to enable remote management of the PDU as well as providing information to the operator of the PDU, including power metering information, power outlet on/off control and/or alarms. Power devices, such as UPSs, provide regulated, uninterrupted power for sensitive and/or critical loads, such as computer systems and other data processing systems.

The UPS 22 includes a generally rectangular housing configured to support the operating components of the UPS. Known types of UPSs include on-line UPSs, off-line UPSs, line interactive UPSs, as well as others. On-line UPSs provide conditioned AC power as well as back-up AC power upon interruption of a primary source of AC power. Off-line UPSs do not provide conditioning of input AC power but do provide backup AC power upon interruption of the primary AC power source. Line interactive UPSs are similar to off-line UPSs in that they switch battery power when a blackout occurs but also include a voltage regulation mechanism, including but not limited to a multi-tap transformer to regulate the output voltage provided by the UPS.

In one embodiment, the expandable PDU 20 includes a PDU enclosure 24 that is secured to the back side of the UPS 22. As shown, the PDU enclosure 24 extends from a back surface of the UPS 22. The PDU enclosure 24 includes a sliding mechanism 26 that is slidable within an opening provided in the PDU enclosure between a default closed position in which outlets of the PDU are hidden and an extended open position in which the outlets are exposed for use. The sliding mechanism 26, sometimes referred to as a sliding power distribution unit (PDU), may be configured to be at least partially within the PDU enclosure 24 in a closed position and to at least partially extend beyond the PDU enclosure in an open position. The sliding mechanism 26 is configured to present a desired number of outlets of a plurality of outlets. In the shown embodiment, the sliding mechanism 26 extends in a direction that is generally perpendicular to a back surface of the PDU enclosure 24.

FIG. 4A illustrates the sliding mechanism 26, which can be referred to as a cartridge, in the default (closed) position, with the sliding mechanism having a holding knob 28 to move the sliding mechanism. As its name implies, the holding knob 28 can be grasped by a person operating the sliding mechanism 26 to move the sliding mechanism to the extended (open) position. The sliding mechanism 26 further has a locking screw 30 to lock the sliding mechanism in place in the extended (open) position. The locking screw 30 may be configured to engage the sliding mechanism from outside the PDU enclosure 24. In one embodiment, the locking screw 30 may include a thumb screw or some other device that is manipulated by hand to secure the sliding mechanism 26 in place. In another embodiment, the locking screw 30 may be a traditional machine screw that is manipulated by a tool, such as a screwdriver.

Figures 4C, 4D:
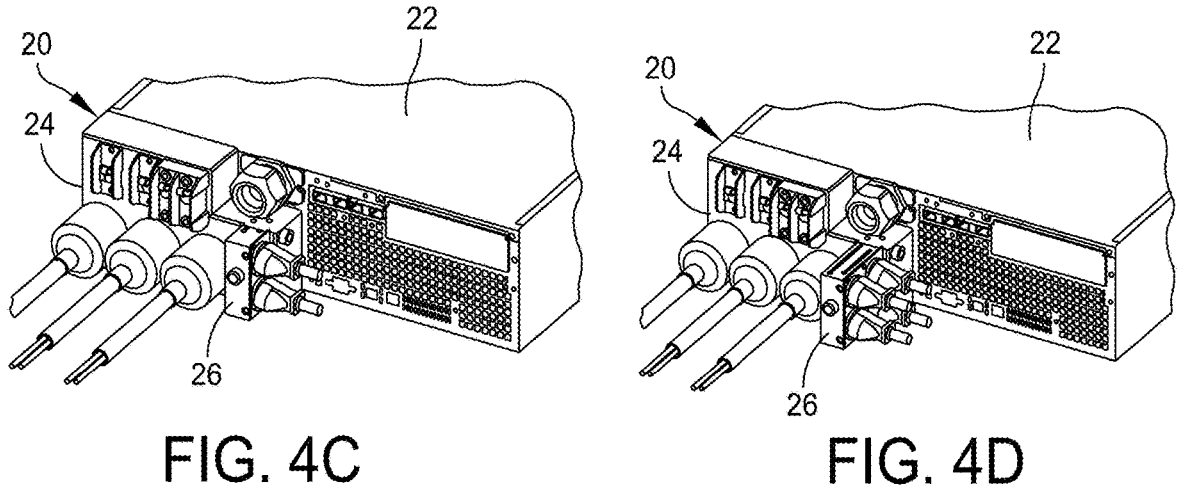

FIG. 4B illustrates the sliding mechanism 26 in the extended (open) position, revealing four (4) outlets of the extended PDU. FIG. 4C illustrates the sliding mechanism 26 in the extended position, revealing two (2) outlets each having a connector. In these positions, the locking screw 30 may be used to secure the sliding mechanism 26 in place. FIG. 4D illustrates the sliding mechanism 26 shown in FIG. 4B, with connectors being secured to the four (4) outlets.

Figures 5A, 5B, 5C:
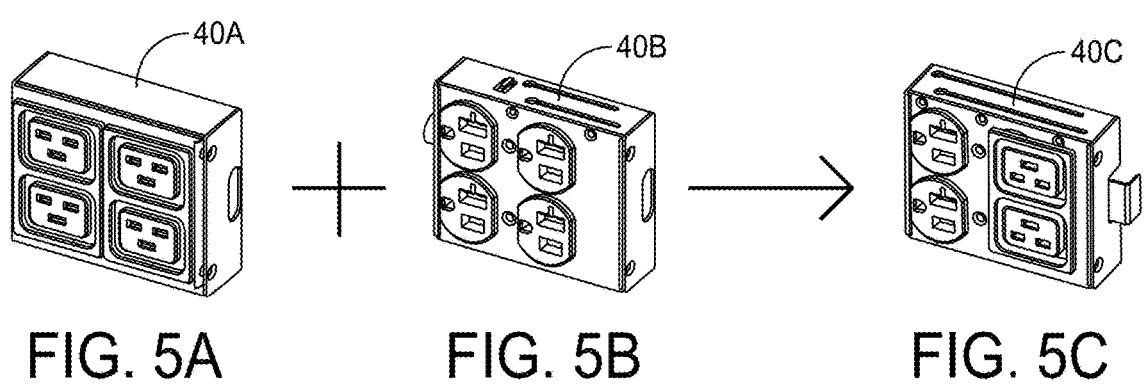
FIGS. 5A-5C are perspective views showing sliding mechanism having different types of connectors showing modularity of the sliding mechanism.

Referring to FIGS. 5A-5C, the PDU is modular in construction and can be arranged to achieve a variety of outlet configurations. As shown, PDU 40A includes four outlets provided in one configuration (FIG. 5A), PDU 40B includes four outlets in another configuration (FIG. 5B), and PDU 40C includes four outlets of yet another configuration (FIG. 5C).

Figure 6:
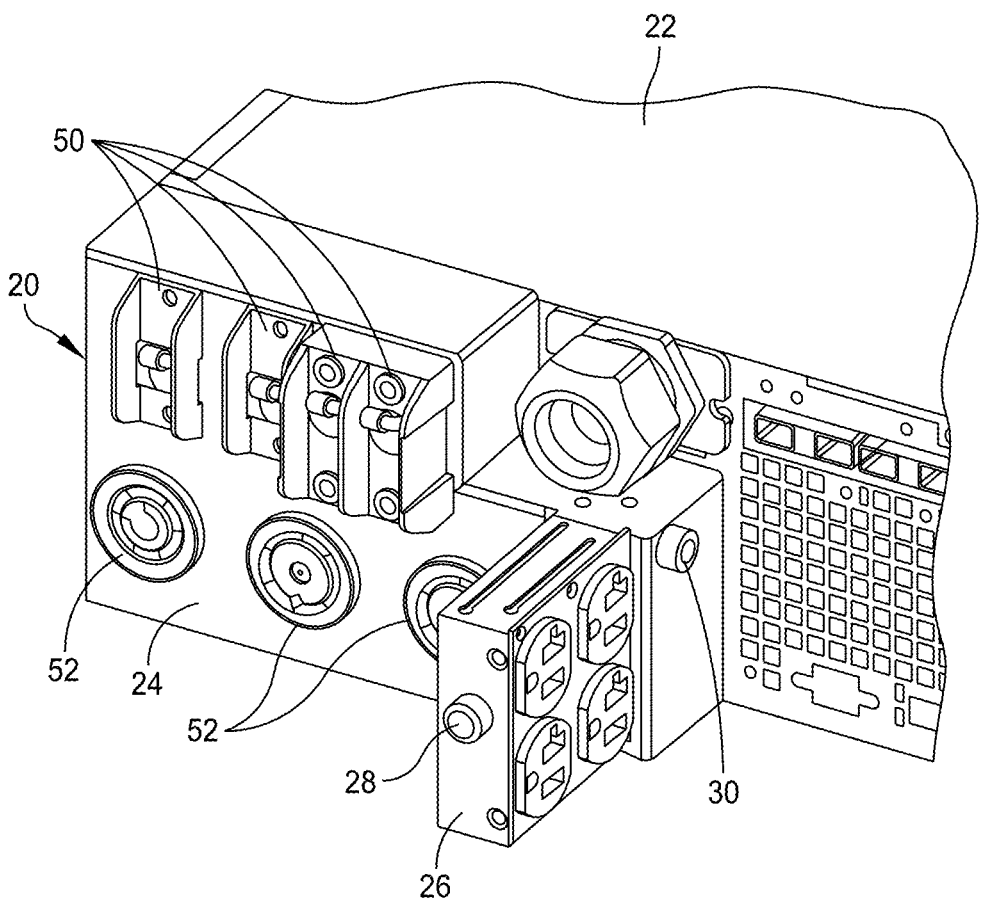
FIG. 6 is an enlarged perspective view of the expandable PDU.

Referring to FIG. 6, which is an enlarged view of the expandable PDU 20 shown in FIG. 4B, the PDU enclosure 24 includes the sliding mechanism 26 having the four (4) outlet PDU, four (4) circuit breakers each indicated at 50, and three (3) connector outlets each indicated at 52. The face of the PDU enclosure 24 can be configured with any number of circuit breakers and/or connectors based on a desired need. The narrow profile of the sliding mechanism 26 creates more surface area on the face of the PDU enclosure to allow for more circuit breakers and/or connectors. Shown in the extended position, the sliding mechanism 26 extends generally perpendicularly with respect to a back surface of the PDU enclosure 24.

In some embodiments, each outlet, which may be referred to as a socket, may be configured to receive a plug. The type of outlet and plug may include a standard NEMA connector (grounded and non-grounded). The type of outlet and plug further may include other types of outlets, including but not limited to a C14, C16, C16A, C20, C22, or some other type. As noted, the number of outlets provided on the sliding mechanism 26 may embody any number of configurations.

Figure 7A:
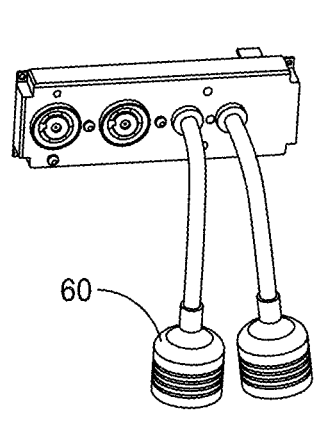
FIG. 7A is a perspective view of an existing PDU having pig-tail connectors.
Figure 7B:
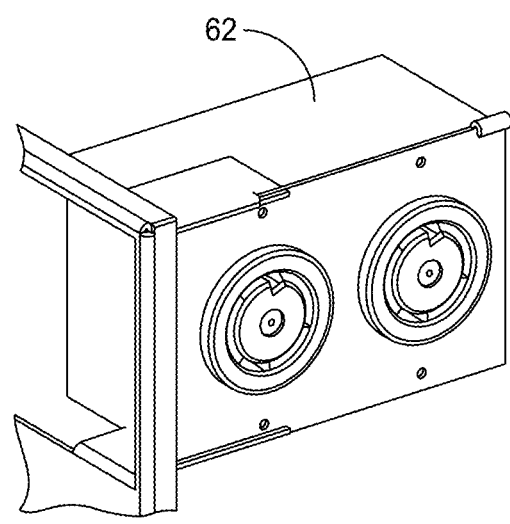
FIG. 7B is a perspective view of a sliding mechanism having two NEMA connector outlets.

Referring to FIGS. 7A and 7B, FIG. 7A illustrates a pig-tail connector 60 and FIG. 7B illustrates a sliding mechanism 62 having two NEMA connector outlets. The cost for a typical pig-tail connector, e.g., pig-tail connector 60 (FIG. 7A), is greater than the cost of PDU connectors (FIGS. 4B and 7B), e.g., PDU connector 62. Embodiments of the expandable PDU 20 provide a low-cost solution that can be 2.5 times less than presently available PDUs.

Referring to FIG. 8, the expandable PDU 20 is shown to have several connectors attached to the connector outlets 52. The expandable PDU 20 includes more area on a back surface of the PDU enclosure 24 of the expandable PDU and more area when the sliding mechanism 26 is open to improve ventilation. Further, the sliding mechanism 26 of the expandable PDU 20 includes a locking mechanism, e.g., locking screw 30, to maintain the sliding mechanism 26 in place when extending the sliding mechanism. In one embodiment, the locking mechanism includes the locking screw/knob 30 that is configured to releasably engage the sliding mechanism 26.

Referring to FIGS. 9A and 9B, the available footprint area 70 shown in FIG. 9A of the sliding mechanism 26 (FIG. 9B) is maximized to provide multiple outlets on the sliding mechanism. The sliding mechanism 26 of the expandable PDU provides an approach to eradicate the need of excess space for additional outlets. Further, the sliding mechanism 26 includes a tray 80 having two guide slots each indicated at 82 formed in a top wall of the tray. The slots 82 are provided to receive pins to guide the tray 80 of the sliding mechanism 26 when extending and retracting the sliding mechanism.

Figures 10A, 10B, 10C, 10D, 10E, 11A, 11B:
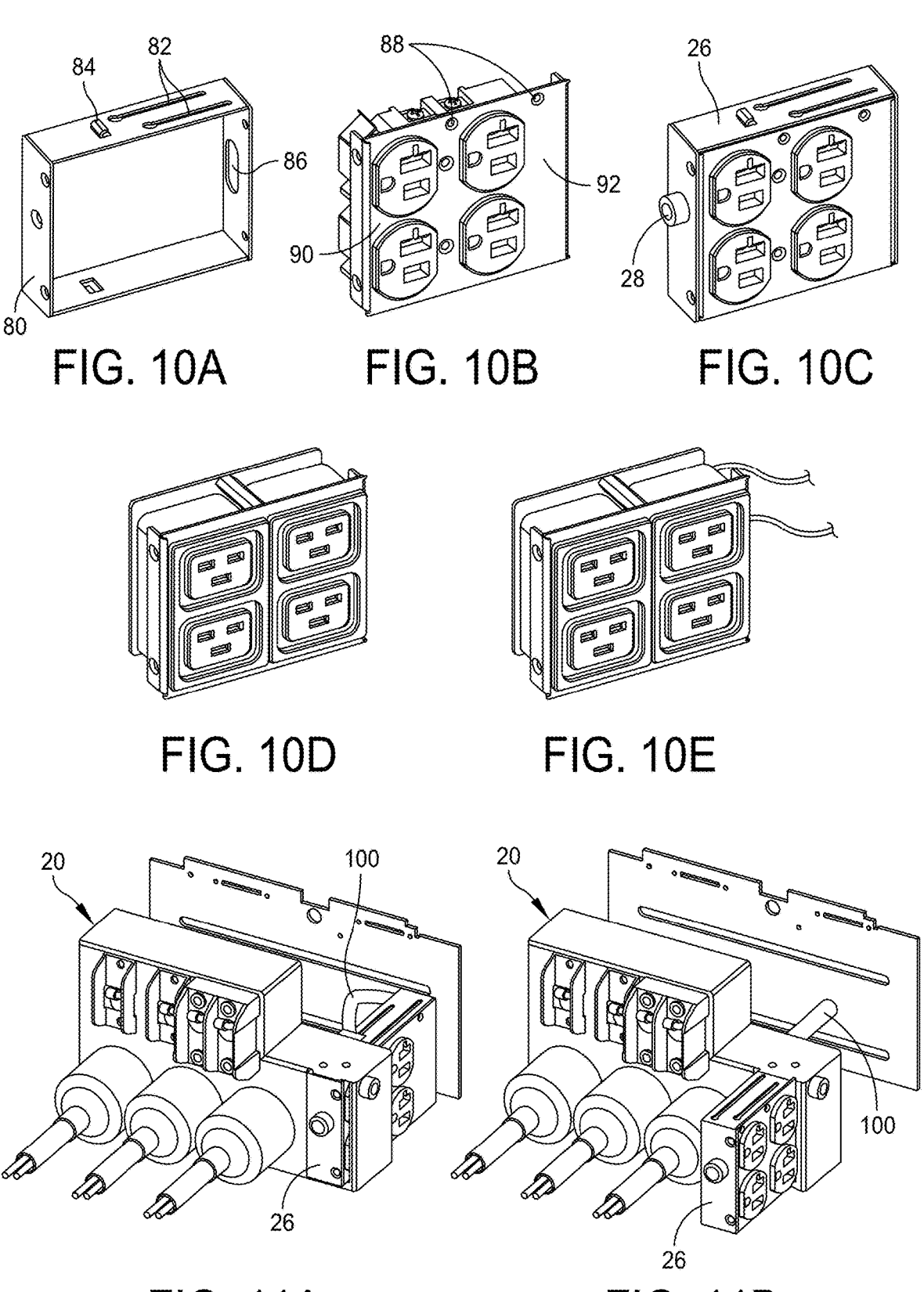
FIGS. 10A-10E are perspective views of various aspects of the sliding mechanism.
FIG. 11A is an enlarged perspective view showing the sliding mechanism of the expandable PDU in the default position.
FIG. 11B is an enlarged perspective view showing the sliding mechanism of the expandable PDU in the extended position.

Referring to FIGS. 10A-10E, a variety of outlet configurations are illustrated. FIG. 10A illustrates the tray 80 of the sliding mechanism. FIG. 10B illustrates an exemplary connector assembly 90 having a front cover 92 configured to receive four outlets. FIG. 10C illustrates the assembled sliding mechanism 26, including the tray 80 and the connector assembly 90, with the four outlets provided on the front surface of the sliding mechanism. FIG. 10D illustrates a back surface of the sliding mechanism having an IEC connector with a printed circuit board (PCB) assembly. FIG. 10E illustrates a PCB with soldered cables connecting the PCB to the UPS.

Further, FIG. 10A shows the guide slots 82 referenced above, as well as a stopper flange 84 configured to limit the extension of the tray 80 of the sliding mechanism 26 when moved to the extended position. The tray 80 of the sliding mechanism 26 further includes a slot 86 for cables or a cable guide. FIG. 10B shows recesses or dimples each indicated at 88 positioned to receive the locking screw/knob 30 when securing the sliding mechanism 26 in the open position.

Referring to FIGS. 11A and 11B, FIG. 11A shows the sliding mechanism 26 of the expandable PDU 20 in the default (closed) position and FIG. 11B shows the sliding mechanism in the extended or open position. When in the default position, a cable 100 is looped inside the expandable PDU 20 without damaging the cable by using a cable tie support. When in the extended position, the cable 100 is straight and extends between the expandable PDU 20 and the UPS.

Figures 12A, 12B, 12C, 12D, 12E, 12F, 12G, 12H:
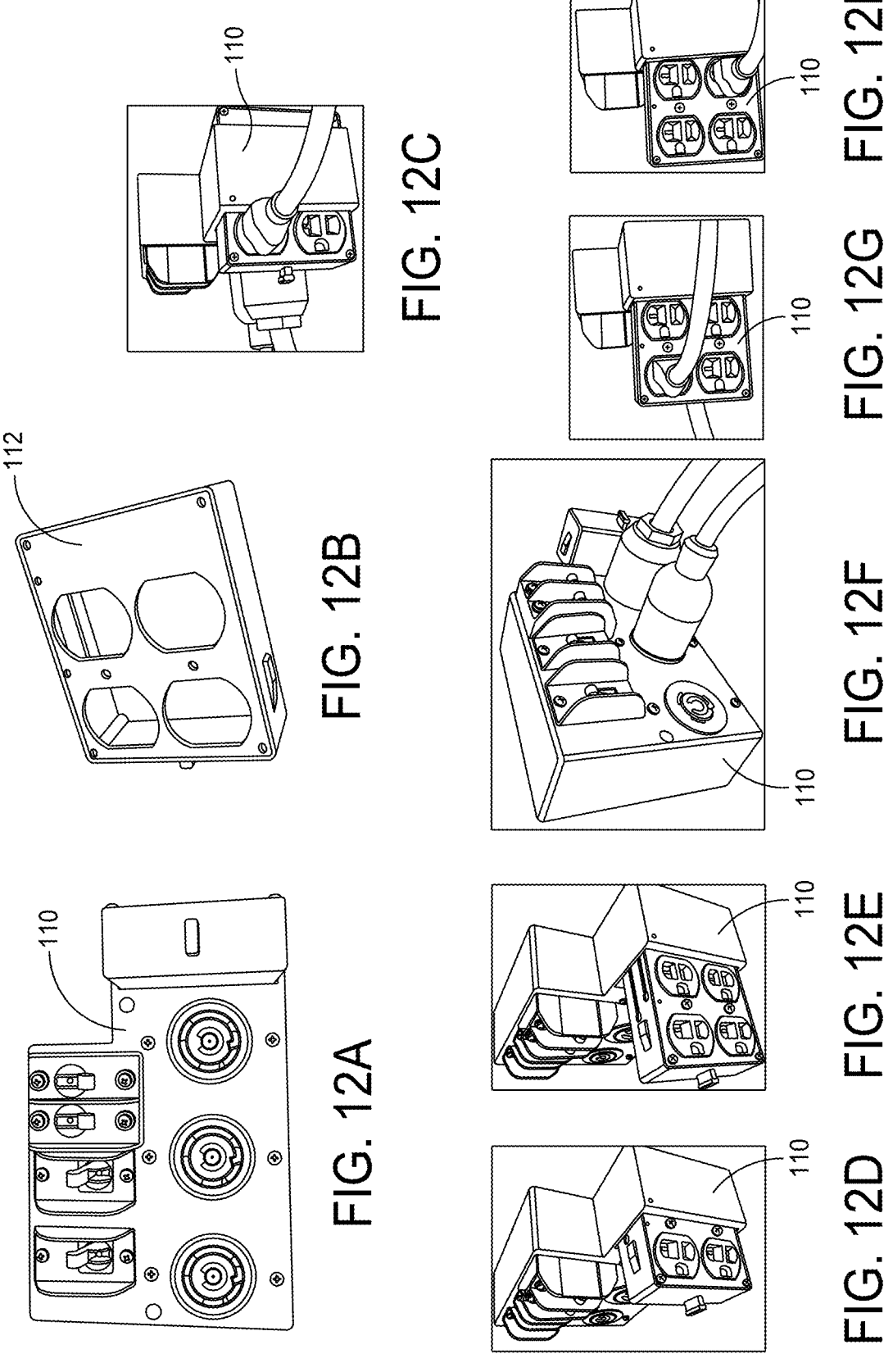
FIGS. 12A-12H are views showing various aspects of a prototype of the expandable PDU.

Referring to FIGS. 12A-12H, various aspects of an expandable PDU, indicated at 110, of an embodiment of the present disclosure are shown. FIG. 12A illustrates the expandable PDU 110 in an initial default (closed) position. The sliding mechanism of the expandable PDU 110 is in the closed position within the opening of the PDU enclosure. FIG. 12B illustrates an expandable tray 112. The expandable tray 112 is configured to receive four outlets. FIGS. 12C and 12D illustrate the expandable PDU 110 in a two-connector position in which two outlets are exposed. FIG. 12E illustrates the expandable PDU 110 in a four-connector position in which four outlets are exposed. FIG. 12F illustrates a connector assembly of the expandable PDU 110. FIGS. 12G and 12H illustrate the expandable PDU 110 in the four-connector position.

Figure 13A:
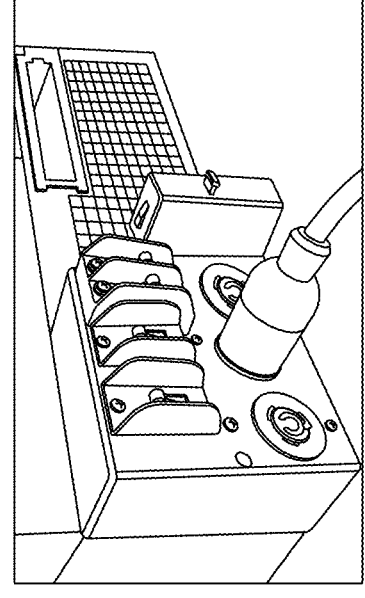
FIGS. 13A-13C are views showing the prototype of the expandable PDU mounted on the UPS.
Figure 13C:
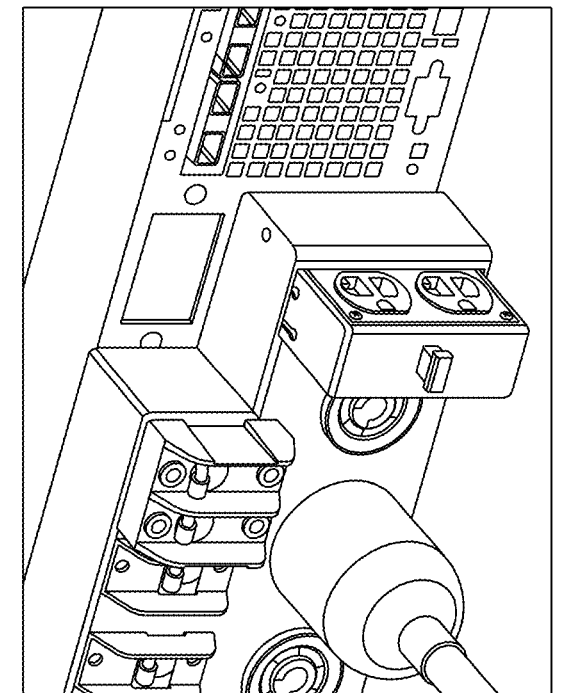
Figure 13B:
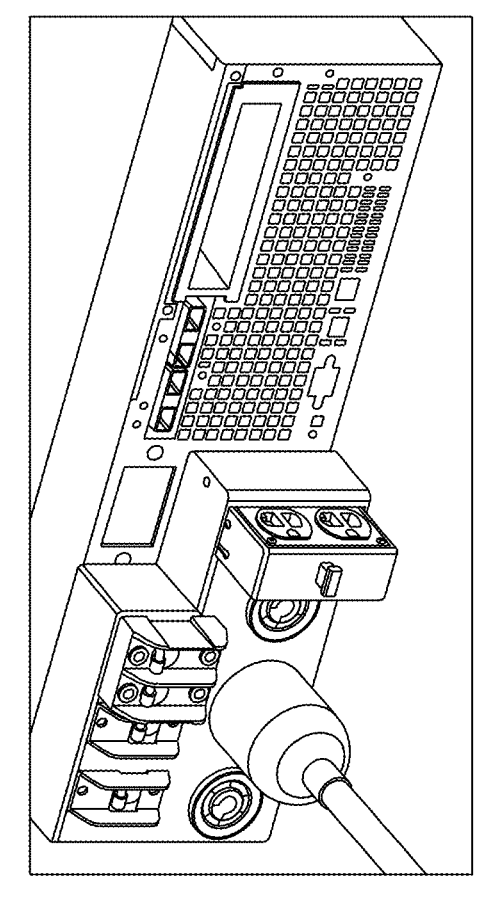

Referring to FIGS. 13A-13C, the expandable PDU shown in FIGS. 12A-12H is illustrated as being mounted on a UPS.

A method of selectively extending power outlets within a power system, such as the UPS 20, is further disclosed. In one embodiment, the method includes extending the sliding mechanism 24, which is configured to be at least partially within the PDU enclosure 22 in a closed position to at least partially extend beyond the enclosure in an open position to reveal outlets. As noted above, the sliding mechanism 24 can be configured to present a desired number of outlets. The sliding mechanism 24 may be moved from the default (closed) position by grasping the holding knob 28 to move the sliding mechanism to the extended (open) position. The method further may include securing the sliding mechanism 24 in place in the open position with the locking screw 30.

Movement of the sliding mechanism 24 may be limited by the stopper flange 84 provided on the sliding mechanism.

The expandable PDU of embodiments of the present disclosure allow flexible combinations of different types of outlets on the sliding mechanism. This construction simplifies manufacturing processes and customization requirements. Customization is a fast-growing trend in the PDU market, and the outlet assemblies and PDU design enable quick and easy customization.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A power system, comprising:
a guiding slot;
an enclosure comprising an interior enclosure surface; and
a sliding power distribution unit (PDU) configured to be at least partially within the enclosure in a closed position and to at least partially extend beyond the enclosure in an open position, wherein:
the sliding PDU comprises a plurality of outlets,
the guiding slot restricts the sliding PDU's movement to a substantially linear movement in at least one position,
at least one outlet of the plurality of outlets is exposed for use when the sliding PDU is in the open position, and
the at least one outlet of the plurality of outlets is obstructed from use by the interior enclosure surface when the sliding PDU is in the closed position, wherein the at least one outlet of the plurality of outlets faces the interior enclosure surface when the sliding PDU is in the closed position.

2. The power system of claim 1, wherein the sliding PDU is configured to present a desired number of outlets of the plurality of outlets.

3. The power system of claim 1, wherein the enclosure includes a locking screw to secure the sliding PDU in place in the open position.

4. The power system of claim 3, wherein the enclosure includes at least one opening configured to receive the locking screw when securing the sliding PDU in the open position.

5. The power system of claim 1, wherein the sliding PDU includes a stopper flange to limit movement of the sliding PDU to the open position.

6. The power system of claim 1, wherein the sliding PDU includes a holding knob to secure and move the sliding PDU.

7. The power system of claim 1, wherein the enclosure includes a plurality of additional connectors.

8. The power system of claim 1, wherein the enclosure includes a plurality of circuit breakers.

9. The power system of claim 1, wherein the sliding PDU includes a cartridge slidably coupled to the enclosure within an opening formed in the enclosure, the cartridge including the plurality of outlets.

10. The power system of claim 9, wherein the enclosure includes a locking screw to secure the cartridge in place in the open position, and wherein the enclosure further includes at least one opening configured to receive the locking screw when securing the cartridge in the open position.

11. The power system of claim 9, wherein the cartridge further includes a stopper flange to limit movement of the cartridge to the open position.

12. The power system of claim 9, wherein the cartridge further includes a holding knob to secure and move the cartridge.

13. The power system of claim 1, wherein the power system includes an uninterruptible power supply.

14. A method of selectively extending power outlets within a power system, comprising:

extending a sliding power distribution unit (PDU) configured to be at least partially within an enclosure in a closed position to at least partially extend beyond the enclosure in an open position, wherein:

the sliding PDU comprises a plurality of outlets, the power system comprises a guiding slot, the enclosure comprises an interior enclosure surface, the guiding slot restricts the sliding PDU's movement to a substantially linear movement in at least one position, at least one outlet of the plurality of outlets is exposed for use when the sliding PDU is in the open position, and the at least one outlet of the plurality of outlets is obstructed from use by the interior enclosure surface when the sliding PDU is in the closed position, wherein the at least one outlet of the plurality of outlets faces the interior enclosure surface when the sliding PDU is in the closed position.

15. The method of claim 14, wherein the sliding PDU is configured to present a desired number of outlets of the plurality of outlets.

16. The method of claim 14, further comprising securing the sliding PDU in place in the open position with a locking screw.

17. The method of claim 16, wherein the sliding PDU includes at least one opening configured to receive the locking screw when securing the sliding PDU in the open position.

18. The method of claim 14, further comprising limiting movement of the sliding PDU to an open position with a stopper flange.

19. The method of claim 14, further comprising securing and moving the sliding PDU with a holding knob.

20. The method of claim 14, wherein the enclosure includes a plurality of additional connectors.

21. The method of claim 14, wherein the enclosure includes a plurality of circuit breakers.

\* \* \* \* \*